March 25, 1941.    J. W. ROCKEFELLER, JR    2,236,158
SPRING
Filed April 26, 1940

WITNESSES:
Dorothy Kern
Russell Cornwell

INVENTOR

Patented Mar. 25, 1941

2,236,158

UNITED STATES PATENT OFFICE 2,236,158

SPRING

John W. Rockefeller, Jr., Short Hills, N. J.

Application April 26, 1940, Serial No. 331,726

8 Claims. (Cl. 267—1)

This invention relates to instrument springs and has special application in the case of spring platform scales. It has been recognized that a coil spring of circular section wire has a substantially straight line load deflection characteristic and it has further been recognized that such straight line characteristic is not desirable in every application. For example, in the case of spring platform scales, levers are employed to reduce and transmit the load from the platform to the springs, which serve as load measuring elements. Such springs are ordinarily located in the superstructure of the scale and the load is transferred to them through levers and a connecting rod which is attached to said levers through a pivot and nose iron. If such springs are designed and manufactured to produce a straight line load deflection characteristic then equal angular movements of lever will not be accompanied by equal vertical displacements of the load supporting end of the spring. When equal increments of loading are placed upon the platform the vertical increments of displacement of the lower end of the springs will also be substantially equal. The angular increments of rotation of the end of the lever, however, will not be equal, nor will the increments of rotation of a pinion which engages a rack ordinarily attached to such lever. This failure of a spring having a straight line load deflection characteristic to produce equal increments of rotation in the indicating part of the scale for equal increments of loading is an objectionable feature of springs and is ordinarily overcome either by adjusting teeth in the rack engaging with the pinion or by weighting the chart which the rack rotates so that the axis of the chart does not pass through the center of gravity of the combined chart, its axis and all parts attached rigidly thereto.

It is further well known that in a steel spring or in springs made of most other alloys the modulus of elasticity of such is so greatly affected by temperature changes that when such springs are used in scales subjected to such temperature changes it is frequently necessary to use in connection with these springs a thermostatic adjustment which will ordinarily correct any changes in the elasticity of the springs due to temperature changes. Materials are available which are less affected in their modulus of elasticity by temperature changes than either steel or most other common metals. However, it is not possible to control the temperature coefficient of elastic modulus of such materials within limits which are necessary for scales built for certain purposes.

Figure 1:
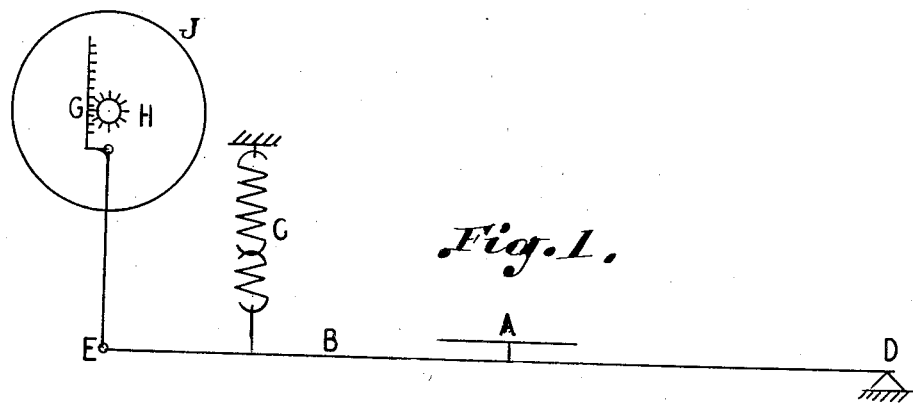
Figure 2:
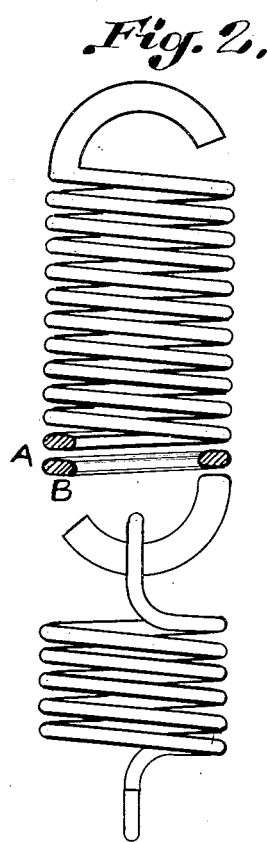

The principal object of my invention is a spring substantially unaffected by temperature changes possessing a non-linear load deflection characteristic of such contour as to produce in a weighing machine in connection with a lever or levers and rotative indicating means a combination which will give equal increments of rotation of the indicating means when equal increments of loading are placed upon the weighing machine platform. In the drawing, Figure 1 shows diagrammatically the general application of my invention, and Figure 2 shows partly in section the extension spring arrangement. In Figure 1, A is a platform upon which material to be weighed is placed. B is a lever which transmits and reduces this load to the springs C. D is a fulcrum about which the lever B rotates. E is a connection through which the end of the lever B is connected to the rack G. H is a pinion with which the rack G engages and which is secured to and integral with chart J. Chart J is sub-divided into equal divisions and indicates the magnitude of the load placed upon platform A. As a load is placed upon platform A the lever B will depart from the horizontal position shown and rotating about D describe an arc until the force resisting elements, springs C counter-balance the force which is thus transmitted to them through the lever. It is desired to have equal increments of loading on a platform A produce equal increments of rotation of the lever B about fulcrum D and, consequently, to produce equal increments of rotation of the indicating chart J. In order to accomplish this the increments of vertical deflection of the lower point of springs C must be gradually decreasing so that the increments by which the sines of the angles made by the lever B in its horizontal position and its subsequent positions will be gradually decreasing. If the increments by which the sines of these angles increase are gradually decreasing the angular increments themselves will be equal. In order to produce a spring which will have gradually decreasing increments of deflection for equal increments of force placed upon it I make this spring of flattened wire coiled on edge. The selected ratio of the axial to the radial dimensions of the wire section will depend upon several factors some of which are the construction of the particular scale in which the spring is to serve as a force measuring unit and more specifically the amplitude of the arc through which the main lever rotates in measuring from zero to full load. Such a spring is shown in Figure 2 in the drawing. The ratio of the axial dimension A to the radial dimension B is always less than 1. It is further desired to have the spring unaffected by temperature changes. In order to accomplish this the spring is made up of two or more sections, each section coiled of material having a different temperature coefficient of elastic modulus than the other. The temperature coefficient of elastic modulus of one section is higher than that which is actually required in the combination and that of the other section is lower than that required for the combination. The lengths of coil used for each section are in such a ratio as to produce the desired temperature coefficient of modulus in the combination when the two sections are joined and used together in series as a single force measuring unit. Further and other objects of my invention will appear in the drawing and the description of my invention. It is evident that many slight changes might be resorted to in the relative arrangement of parts herein shown and described without departing from the spirit and scope of my invention. Hence I would have it understood that I do not wish to confine myself to the exact construction and arrangement of parts shown and described; but, Having fully described my invention, what I claim as new, and desire to secure by Letters Patent, is—

1. A force measuring unit consisting of two spring parts each part made of a different alloy of flattened wire coiled on edge.

2. A force measuring unit consisting of two or more unequal separate spring parts each part having a different thermal coefficient of elastic modulus.

3. A force measuring unit consisting of two or more unequal spring parts, one part having a temperature coefficient of elastic modulus which is greater than that desired in the final combination and the other having a temperature coefficient of elastic modulus less than that desired in the final combination.

4. A force measuring unit comprising two spring parts, one part of which has a thermal coefficient of elastic modulus which is in excess of that desired in the combination and the other part having a thermal coefficient of elastic modulus which is less than that desired in the final combination, the ratio of the amount of wire used in each part being predetermined and selected so as to give the desired thermal coefficient of elastic modulus in the final combination.

5. A force measuring unit comprising two or more spring parts having substantially the same outside diameter but possessing different thermal coefficients of elastic modulus, the ratio of the lengths of the sections being predetermined and selected so as to give the desired thermal coefficient of elastic modulus in the final combination.

6. A force measuring unit comprising two or more spring sections each section having substantially the same outside diameter and being formed of substantially the same size of wire, the ratio of the lengths of the sections being predetermined and selected so as to give the desired thermal coefficient of elastic modulus in the final combination.

7. In a force measuring instrument including a platform, lever and rotating indicating means an extension spring consisting of two or more separate parts each part having a substantially different thermal coefficient of elastic modulus.

8. An extension spring comprising two or more sections each section consisting of flattened wire coiled on edge the ratio of the axial dimensions of the wire section to the radial dimensions being predetermined and so adapted that when used in combination with a platform, lever and rotative indicating means will produce in the indicating means equal rotative increments when equal increments of load are placed upon said platform, each section of the spring being coiled of material having a different thermal coefficient of elastic modulus the length of each section being in such ratio to the others that a predetermined and desirable thermal coefficient of elastic modulus will be possessed by the combination.

JOHN W. ROCKEFELLER, Jr.